US009586356B2

United States Patent
Xu et al.

(10) Patent No.: US 9,586,356 B2
(45) Date of Patent: Mar. 7, 2017

(54) DEVICE AND METHOD FOR DYNAMIC EXTRUSION MOLDING OF PLASTIC ARTICLE HAVING VARIABLE MICRO-CHANNEL

(71) Applicant: ZHEJIANG UNIVERSITY, Hangzhou (CN)

(72) Inventors: Zhongbin Xu, Hangzhou (CN); Jiapei Cao, Hangzhou (CN); Xin Fu, Hangzhou (CN); Xiaodong Ruan, Hangzhou (CN); Suxia Zheng, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 361 days.

(21) Appl. No.: 14/199,954

(22) Filed: Mar. 6, 2014

(65) Prior Publication Data
US 2014/0225301 A1      Aug. 14, 2014

Related U.S. Application Data

(63) Continuation of application No. PCT/CN2011/083734, filed on Dec. 9, 2011.

(30) Foreign Application Priority Data

Dec. 7, 2011     (CN) .......................... 2011 1 0402471

(51) Int. Cl.
*B29C 47/22*        (2006.01)
*B29C 47/80*        (2006.01)
(Continued)

(52) U.S. Cl.
CPC .......... *B29C 47/80* (2013.01); *B29C 47/0021* (2013.01); *B29C 47/0023* (2013.01);
(Continued)

(58) Field of Classification Search
CPC ... B29C 47/0898; B29C 47/122; B29C 47/20; B29C 47/22; B29C 47/225;
(Continued)

(56) References Cited

U.S. PATENT DOCUMENTS 3,046,178 A * 7/1962 Tupper .................... B29C 47/58
                                                           156/167
3,355,763 A * 12/1967 Willert .................... B29C 31/04
                                                           264/540

(Continued)

FOREIGN PATENT DOCUMENTS

CN     200310101653.0        5/2005
CN       200967270 Y        10/2007
(Continued)

OTHER PUBLICATIONS

International Search Report of International Application No. PCT/CN2011/083734, dated Oct. 18, 2012.
(Continued)

*Primary Examiner* — Alison L Hindenlang
*Assistant Examiner* — Joseph Leyson
(74) *Attorney, Agent, or Firm* — J.C. Patents

(57) ABSTRACT

Disclosed is a device and method for dynamic extrusion molding of plastic articles having variable micro-channel. The device mainly includes a single-screw extruder, a dynamic extrusion die, a fluid source, a water sink, a tractor, a winding device, and a data acquisition and control system. Near outlet of extrusion die, when the end portion of a syringe needle is at different positions, the inner diameter of the micro-channel of the extrusion molded plastic article is also different. When the hollow syringe core within the dynamic extrusion die performs a high-frequency short-range vibration along an extrusion direction, the inner diameter of the micro-channel of the extruded plastic articles is
(Continued)

dynamically variable. The plastic articles of variable microchannel of the present invention has novel structure with high dimensional accuracy, and a variety of varying patterns, it can be stably produced by simple processing equipment with high level of automation.

9 Claims, 7 Drawing Sheets

(51) Int. Cl.
| | |
|---|---|
| *B29C 47/86* | (2006.01) |
| *B29C 47/12* | (2006.01) |
| *B29C 47/88* | (2006.01) |
| *B29C 47/82* | (2006.01) |
| *B29C 47/38* | (2006.01) |
| *B29C 47/92* | (2006.01) |
| *B29C 47/00* | (2006.01) |
| *B29C 47/08* | (2006.01) |

(52) U.S. Cl.
CPC ........ *B29C 47/0033* (2013.01); *B29C 47/122* (2013.01); *B29C 47/22* (2013.01); *B29C 47/225* (2013.01); *B29C 47/38* (2013.01); *B29C 47/822* (2013.01); *B29C 47/827* (2013.01); *B29C 47/862* (2013.01); *B29C 47/8835* (2013.01); *B29C 47/8895* (2013.01); *B29C 47/92* (2013.01); *B29C 47/0898* (2013.01); *B29C 47/82* (2013.01); *B29C 2947/92152* (2013.01); *B29C 2947/92514* (2013.01); *B29C 2947/92647* (2013.01); *B29C 2947/92704* (2013.01)

(58) Field of Classification Search
CPC ..... B29C 47/385; B29C 47/68; B29C 47/822; B29C 47/862; B29C 47/8825; B29C 47/8835; B29C 47/8895; B29C 47/92; B29C 2947/92152; B29C 2947/92514; B29C 2947/92647; B29C 2947/92704
See application file for complete search history.

(56) References Cited

U.S. PATENT DOCUMENTS

| | | | | | |
|---|---|---|---|---|---|
| 3,479,422 | A | * | 11/1969 | Zavasnik | B29C 45/14 264/167 |
| 3,501,805 | A | * | 3/1970 | Douglas, Jr. | D01D 5/28 425/131.5 |
| 3,564,653 | A | * | 2/1971 | Sparks et al. | B29C 47/26 425/141 |
| 3,728,056 | A | * | 4/1973 | Theysohn | B29C 47/1054 425/135 |
| 3,817,377 | A | * | 6/1974 | Piggott | B01D 29/05 210/409 |
| 4,171,193 | A | * | 10/1979 | Rahlfs | B29C 47/38 264/40.7 |
| 4,333,906 | A | * | 6/1982 | Porter | B01D 69/08 264/167 |
| 6,012,621 | A | * | 1/2000 | Hoium | G02B 6/4463 226/172 |
| 6,572,800 | B1 | | 6/2003 | Ladera Sainz et al. | 264/50 |
| 2006/0172028 | A1 | * | 8/2006 | Arruda | B29C 47/0023 425/182 |
| 2008/0105703 | A1 | * | 5/2008 | Prentice | B05C 5/0225 222/63 |
| 2010/0110823 | A1 | * | 5/2010 | Womer | B29B 7/42 366/79 |

FOREIGN PATENT DOCUMENTS

| | | |
|---|---|---|
| CN | 101905535 A | 12/2010 |
| CN | 102029704 A | 4/2011 |
| CN | 102514173 B | 5/2014 |
| EP | 1 666 223 A1 | 6/2006 |
| JP | 08-150655 A | 6/1996 |
| WO | WO2005/056272 A1 | 6/2005 |

OTHER PUBLICATIONS

Chinese First Examination Report of correspondence Chinese Application No. 201110402471.1.
Cao, Jia-Pei et al., "Polymer Microcapillary Film Extrusion Process and Applications" Packaging Engineering, vol. 31, No. 7, Apr. 2010.

* cited by examiner

DEVICE AND METHOD FOR DYNAMIC EXTRUSION MOLDING OF PLASTIC ARTICLE HAVING VARIABLE MICRO-CHANNEL

CROSS-REFERENCE TO RELATED APPLICATIONS

This application is a continuation of International Application No. PCT/CN2011/083734, filed on Dec. 9, 2011, which claims the priority benefit of China Patent Application No. 201110402471.1, filed on Dec. 7, 2011. The contents of the above identified applications are incorporated herein by reference in their entireties.

FIELD OF THE TECHNOLOGY

The present invention relates to an extrusion molding technology of plastic articles, and more particularly to a device and method for dynamic extrusion molding of plastic articles having variable micro-channel.

BACKGROUND

Extrusion molding is mainly used for extrusion molding of plastic articles, such as fibers, films, tubes, rods, plates and profiles, with the same cross-section, but cannot mold plastic articles with variable cross section. Plastic articles having small hollow channels, such as medical microtubules, hollow fibers, etc., can also be made by extrusion molding. The common method for extrusion molding of plastic articles having small diameter hollow channels generally includes the steps of installing a hollow core in an extrusion die, and introducing an injection fluid that is generally air or compressed air into the hollow core. For example, Mackley et al. of Cambridge University proposed a molding method of micro-channel film including a plurality of parallel capillary channels (WO 2005/056272), and Wu Daming et al. proposed a molding method of plastic articles including small bore therein (CN 200310101653.0). However, the hollow channels formed in these molding methods have constant inner diameters, and it is difficult by these methods to form hollow channels having dynamically variable diameters.

The molding methods of corrugated plastic pipes can achieve dynamic variability of the hollow channel, but these methods have the following disadvantages: (1) the inner diameter of the channel is generally large, and thus cannot be processed at micron scale; (2) variability of the channel is achieved by a follow-up mechanical molding device, and thus its inner diameter has less varying patterns; (3) the outer diameter of the channel also dynamically varies; and (4) these methods only apply to single-channel pipes.

Device and method for dynamic extrusion molding of plastic articles having variable micro-channel according to the present invention can remedy disadvantages of the above methods: the micro-channel is formed in one-step extrusion molding and has dynamically variable inner diameter while the external diameter is basically invariable; a large number of variable micro-channels can be integrated together; the varying patterns of these variable micro-channels can be conveniently adjusted.

SUMMARY

An object of the present invention is to provide a device and method for dynamic extrusion molding of plastic articles having variable micro-channel, which can be used for one-step extrusion molding of plastic articles having variable cross section, to overcome disadvantages of the prior arts.

The object of the present invention is achieved by the following technical solutions: a device for dynamic extrusion molding of plastic articles having variable micro-channel includes: a single-screw extruder, a flange, a winding device, a dynamic extrusion die, a valve, a pressure regulator, a fluid source, a water sink, a pulley, a tractor, a data acquisition and control system, etc.; wherein the single-screw extruder includes a hopper, a motor, a screw, a barrel, a band heater and a heating controller, etc.; a rotation shaft of the motor is connected to the screw within the barrel by a coupler, the exterior of the barrel except for the front and end faces is covered with three sections of the band heater, all of which are connected to the heating controller, and the barrel is connected to the dynamic extrusion die by flanges, a filter is provided between flanges; the exterior of the dynamic extrusion die except for the front and end faces is covered with a heating coil, and the fluid source, the pressure regulator, the valve and the dynamic extrusion die are connected to each other in sequence by pipes, where the water sink is disposed below the dynamic extrusion die, the pulley is fixed in the water sink, and the tractor and the winding device are disposed in sequence behind the water sink.

Further, the data acquisition and control system includes: pressure sensors P1 and P2, temperature sensors T1-T4, a proximity switch, a computer with data card and the heating controller, etc.; wherein the temperature sensors T1-T3 are respectively mounted at the three sections of the band heater that cover the exterior of the barrel, the temperature sensors T1-T3 are all connected to the heating controller, the temperature sensor T4 is mounted at the heating coil that cover the exterior of the dynamic extrusion die, the temperature sensor T4 also is connected to the heating controller, the pressure sensor P1 is mounted inside of the dynamic extrusion die, the pressure sensor P2 is mounted at outlet of the valve, the proximity switch is near to the tractor, and the proximity switch, the temperature sensor and the pressure sensor are all connected to the computer with data card.

Further, the dynamic extrusion die includes: a die connector, a die flow channel entrance section, a positioning screw, a die platen, a head die, a die body, a die cover, a syringe core and a linear voice coil motor, wherein the die cover is fixed on the die body; the die connector is fixed on the die body; the head die locates at the outlet of the die body and is compacted by the die platen; the positioning screw is screwed into the die body to adjust the radial position of the head die; the die connector, the head die, the die body and the die cover together form one flow channel, and the flow channel is formed with a flow channel entrance section, a flow channel convergence section, a flow channel molding section and a flow channel outlet; the syringe core is composed of a syringe body and a syringe needle, with one end of the syringe body being connected to the linear voice coil motor, and the other end of the syringe body passing through the die cover to enter the die body and being soldered together with the syringe needle; and the internal channel of the syringe body communicates with that of the syringe needle to form a syringe flow channel, which communicates with the valve.

A method for dynamic extrusion molding of plastic articles having variable micro-channel using the above device includes the following steps:

(1) driving the screw of the single-screw extruder by the motor, and adding a plastic raw material into the barrel through the hopper to gradually plasticize the plastic under the rotation and transport of the screw and the electrical heating of band heater, so as to form a plastic melt, which passes through flanges to enter the dynamic extrusion die under the rotation and pushing of the screw, with a filter provided between the flanges trapping the non fully plasticized solid and semi-solid, (2) guiding the plastic melt to pass through the die connector to enter the flow channel formed by the die connector, the head die, the die body and the die cover, to cover the exterior of the syringe core, where when pressure of the plastic melt in the flow channel convergence section gradually increases to 2-5 MPa, the plastic melt enters the flow channel molding section, (3) driving the syringe core to vibrate along the extrusion direction by the linear voice coil motor, where the distance y between the outer end face of an syringe needle and the outer end face of the head die varies in patterns of controlled harmonic vibration, as shown in FIG. 8 (in various regular or irregular vibration modes decided by programmes embedded in control system, as shown in FIGS. 10-15); supplying the injection fluid by the fluid source and guiding the injection fluid to pass through the syringe flow channel into the plastic melt and form a micro-channel under the pressures of the plastic melt and the injection fluid, where the interface of the micro-channel periodically varies, thereby forming an extrusion micro-channel, and an extrusion plastic matrix is formed with the gradual cooling and solidification of the plastic melt, and (4) extruding the extrusion plastic matrix having the extrusion micro-channel from the flow channel outlet, and introducing it into the water sink by the pulley under the pulling of the tractor, where circulation of cooling water is used to rapidly cool and solidify the plastic extrusion, so as to eventually form a plastic extrusion having variable micro-channel.

The present invention has the following beneficial effects:

1. The plastic articles having micron-sized channels with dynamically variable inner diameter can be made through extrusion molding of the present invention;

2. The structural parameters of the variable micro-channel of the plastic articles, such as inner diameter, amplitude of vibration, period, whether the variable micro-channel is continuously run-through or not, etc, can be freely varied, and thus the device has a strong adaptability;

3. The micro-channel inside the plastic article is dynamically variable, while the external dimension of the plastic article remains basically invariable;

4. Through integration, a large number of the variable micro-channels can be assembled in one plastic article; and 5. The variable micro-channel according to the present invention can be extruded easily and stably with high level of automation and low labor intensity, and use of the data acquisition and control system can easily record and analyze data, set the operating parameters, and perform programming and automatic control.

In these figures, 1: plastic raw material, 2: hopper, 3: motor, 4: screw, 5: barrel, 6: band heater, 7: flange, 8: winding device, 9: dynamic extrusion die, 10: valve, 11: pressure regulator, 12: fluid source, 13: water sink, 14: pulley, 15: cooling water, 16: proximity switch, 17: tractor, 18: plastic extrusion having variable micro-channel, 19: die connector, 20: flow channel entrance section, 21: connector fixing screw, 22: positioning screw, 23: flow channel convergence section, 24: syringe needle, 25: copper soldering joint, 26: die platen, 27: head die, 28: flow channel outlet, 29: flow channel molding section, 30: die body, 31: die cover, 32: die cover fixing screw, 33: syringe body, 34: air supply pipe, 35: air supply flow channel, 36: syringe flow channel, 37: syringe core, 38: linear voice coil motor, 39: extrusion plastic matrix, 40: extrusion micro-channel, 41: plastic melt, 42: computer with data card, 43: heating coil, 44: heating controller.

DETAILED DESCRIPTION

The variable micro-channel structure refers to a structure where the cross section of the micro-channel dynamically varies in the extrusion direction of plastic articles. The micro-channel may be continuously run-through, or may be discontinuously and independently closed (as is shown in FIGS. 10-15). The cross section of the hollow micro-channel may be circular, triangular, rectangular, polygonal, etc. Multiple variable micro-channels can be integrated into a plastic to be extruded, such as film, pipe, sheet, plate, profile, to obtain a plastic article with multiple variable micro-channels. The cross-sectional dimensions of the micro-channels are mainly in the range of 50-500 microns, and also can be expanded to such as millimeter or sub-micron scale, with a dynamically variable cycle-length of 100 μm-5 mm. The variable micro-channel according to the present invention has novel structure and a variety of varying patterns, and it can be produced with simple processing equipment with high level of automation. The plastic article can be extruded stably with high dimensional accuracy.

The present invention provides a device and method for dynamic extrusion molding of plastic articles having variable micro-channel. Usually a hollow channel has stable inner diameter, and is generally produced by injecting a fluid such as compressed air into a plastic melt, wherein fluid pressure, flow rate and extrusion die structure remain invariable during the extrusion process, and thus the extruded plastics article has stable cross-section.

Figure 7:
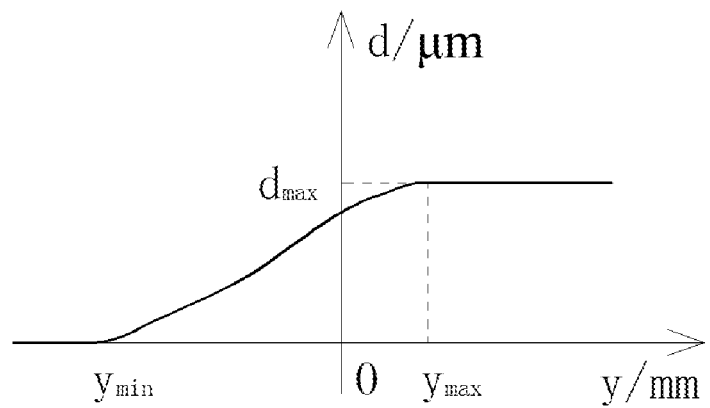
FIG. 7 is a relation curve between the end position y of the syringe core and the inner diameter d of the extrusion molded micro-channel under steady-state experimental conditions, wherein, $y_{max}$ represents the end position y corresponding to the maximum inner diameter d of the micro-channel, and $y_{min}$ represents the end position y corresponding to the inner diameter of the micro-channel equal to zero.
Figure 8:
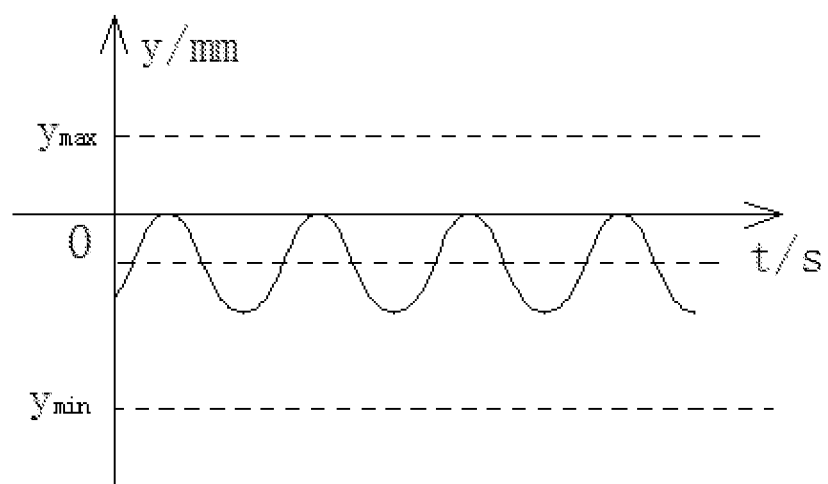
FIG. 8 is a schematic diagram of a controlled harmonic vibration curve of the distance y between the outer end face of the syringe needle of the syringe core and the outer end face of the head die.
Figure 9:
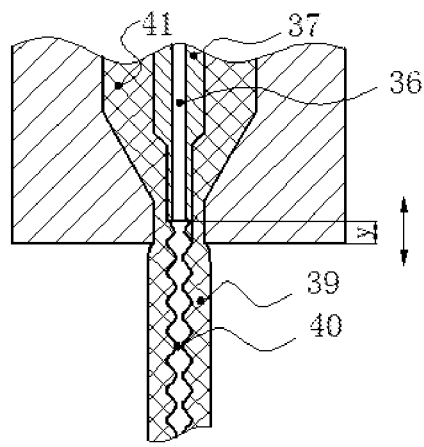
FIG. 9 is a schematic diagram of dynamic extrusion molding of plastic articles having variable micro-channel at high-frequency vibration of the syringe core shown in FIG. 8.
Figure 10:
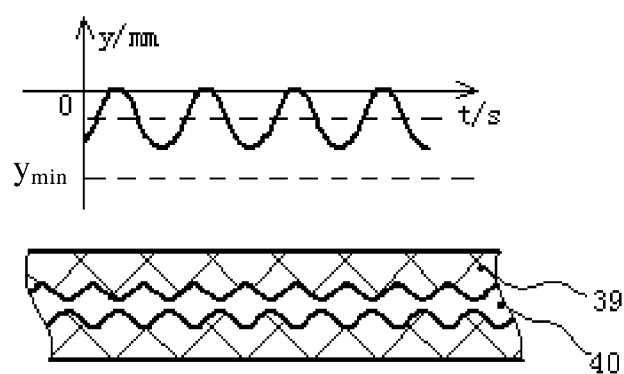
FIGS. 10-12 are exemplary illustration of a longitudinal section of continuous and variable micro-channel dynamically extruded at high-frequency vibrations of three kinds of syringe cores.
Figure 11:
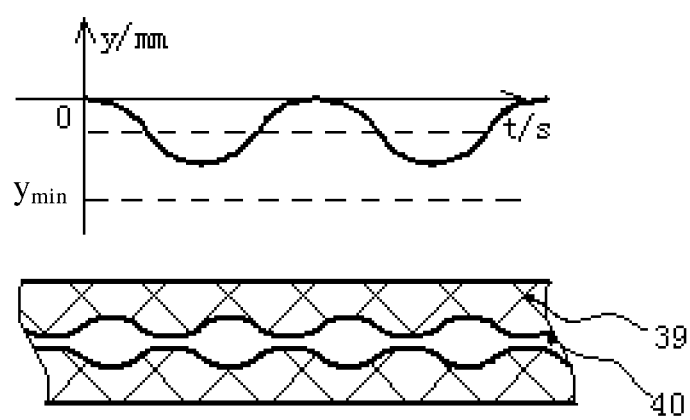
Figure 12:
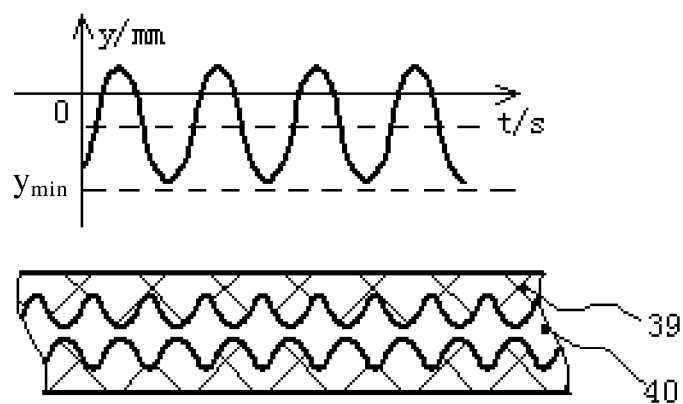
Figure 13:
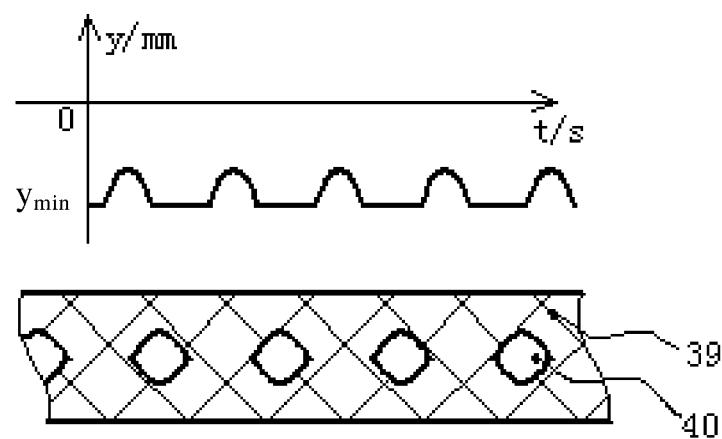
FIGS. 13-15 are exemplary illustration of longitudinal section of noncontinuous and variable micro-channel dynamically extruded at high-frequency vibrations of three kinds of syringe cores.
Figure 14:
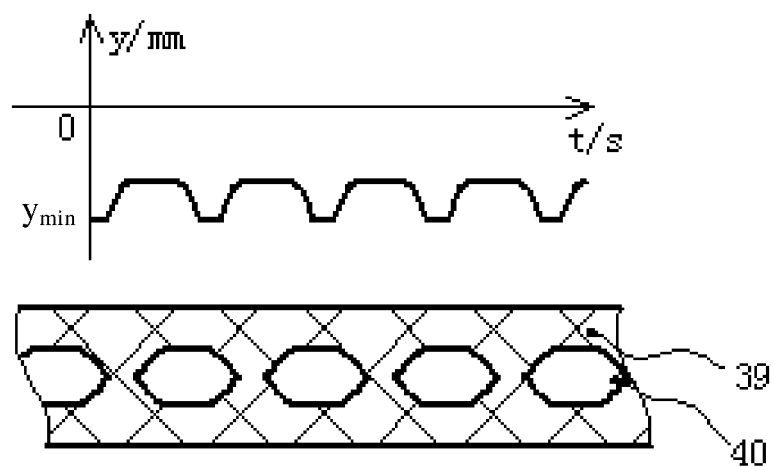
Figure 15:
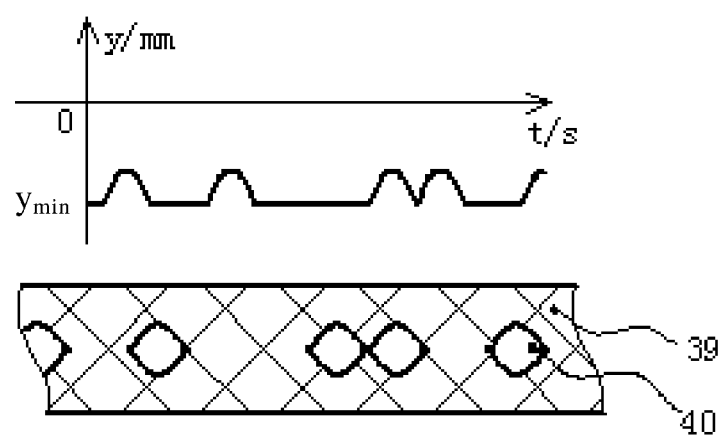

The present invention utilizes the following principle: under steady-state extrusion conditions, a fluid at stable pressure and flow rate (the fluid may be a chemically and physically stable fluid under processing conditions, for example, air, compressed gas, silicone oil, or may be fluid drugs that need to be encapsulated, etc.) is injected into a plastic melt by a syringe core, and when the syringe core is at different end positions, the inner diameter of the micro channel of the extrusion molded plastic is also different. FIGS. 3-6 shows the inner diameter of the micro-channels is $d_{1-4}$ respectively when the distance between the outer end face of the syringe needle of the syringe core and the outer end face of the head die is $y_{1-4}$ respectively. FIG. 7 is a relation curve between the end position y of the syringe core and the inner diameter d of the extruded micro-channel under steady-state experimental conditions (the extrusion direction is positive direction of y), which shows that there is an approximate linear relation between the inner diameter d of the extruded micro-channel and the end position y of the syringe core. In addition, under dynamic conditions, a high-frequency short-range vibration of the syringe core in a longitudinal direction can lead to longitudinally dynamic variety of the inner diameter of the micro-channel within the extruded plastic articles. FIG. 8 shows a schematic diagram of a controlled harmonic vibration curve of the distance y between the outer end face of the syringe needle of the syringe core and the outer end face of the head die, and FIG. 9 shows a schematic diagram of extrusion molding of plastic articles having variable micro-channel at high-frequency vibration of the syringe core shown in FIG. 8. The dynamic variety of the inner diameter of the extruded micro-channel along extrusion direction can be achieved by changing the vibration pattern of the syringe core. FIGS. 10-12 exemplarily illustrate a longitudinal section of continuous and variable micro-channel dynamically extruded at high-frequency vibrations of three kinds of syringe cores; and FIGS. 13-15 exemplarily illustrate a longitudinal section of non-continuous and variable micro-channel dynamically extruded at high-frequency vibrations of three kinds of syringe cores. According to the present invention, a plastic article having a single variable micro-channel can be extruded, and multiple variable micro-channels can also be easily integrated simply by increasing the number of needles in the die of the extruder. As a result, plastic articles containing a plurality of micro-channels, such as films, pipes, sheets, plates, profiles, can be prepared through extrusion.

The present invention is applicable to the extrusion of a plastic article that needs to have a dynamically variable hollow micro-channel therein, for example: a micro-mixer, a catheter, a hollow fiber, a profile, each having a dynamically variable inner diameter. The cross section of the hollow micro-channel may be circular, triangular, rectangular, polygonal, and size of the hollow micro-channel is micron-scale or even nano-scale.

The plastic article having variable micro-channel prepared according to the present invention can be used in a micro-reactor, a micro-mixer, a micro-heat exchanger, a micro-sensor, a micro-fluidic chip, capillary electrophoresis, DNA and in biomedical applications, such as analysis and monitoring of proteins, guard against falsification, packaging materials of drugs, slow release of drugs, optical elements, tissue engineering scaffolds, foam materials and medical catheters.

Figure 1:
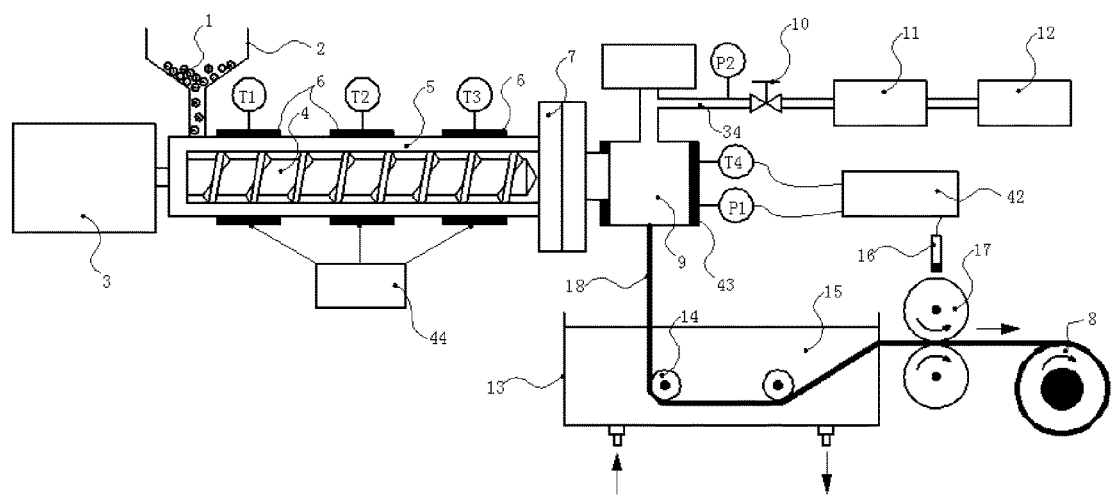
FIG. 1 is a schematic diagram of general assembly of a device for dynamic extrusion molding of plastic articles having variable micro-channel.

As is shown in FIG. 1, the device for dynamic extrusion molding of plastic articles having variable micro-channel according to the present invention includes the following components: a single-screw extruder, a flange 7, a winding device 8, a dynamic extrusion die 9, a valve 10, a pressure regulator 11, a fluid source 12, a water sink 13, a pulley 14, a tractor 17, and a data acquisition and control system. Where the single-screw extruder includes: a hopper 2, a motor 3, a screw 4, a barrel 5, a band heater 6 and a heating controller 44. The rotation shaft of the motor 3 is connected to the screw 4 within the barrel 5 by a coupler, the exterior of the barrel 5 except for the front and end faces is covered with three sections of the band heater 6, all of which are connected to the heating controller 44, and the barrel 5 is connected to the dynamic extrusion die 9 by the flanges 7, a filter is provided between flanges 7; the exterior of the dynamic extrusion die 9 except for the front and end faces is covered with a heating coil 43, and the fluid source 12, the pressure regulator 11, the valve 10 and the dynamic extrusion die 9 are connected to each other in sequence by pipes, the water sink 13 is disposed below the dynamic extrusion die 9, the pulley 14 is fixed in the water sink 13, and the tractor 17 and the winding device 8 are disposed in sequence behind the water sink 13.

The data acquisition and control system includes: pressure sensors P1 and P2, temperature sensors T1-T4, a proximity switch 16, a computer with data card 42 and the heating controller 44. Where the temperature sensors T1-T3 are respectively mounted at the three sections of the band heater 6 that cover the exterior of the barrel 5 and the temperature sensors T1-T3 are all connected to the heating controller 44, where the heating controller 44 controls on-off and value of the current into these three sections of the band heater 6 based on the temperature information measured by the temperature sensors T1-T3. The temperature sensor T4 is mounted at the heating coil 43 that covers the exterior of the dynamic extrusion die 9 and the temperature sensor T4 also is connected to the heating controller 44, where the heating controller 44 controls on-off and value of the current into the heating coil 43 based on the temperature information measured by the temperature sensor T4. The pressure sensor P1 is mounted inside of the dynamic extrusion die 9, the pressure sensor P2 is mounted at outlet of the valve 10, the proximity switch 16 is near to the tractor 17, and the proximity switch 16, the temperature sensor T4 and the pressure sensor P1 are all connected to the computer with data card 42.

Figure 2:
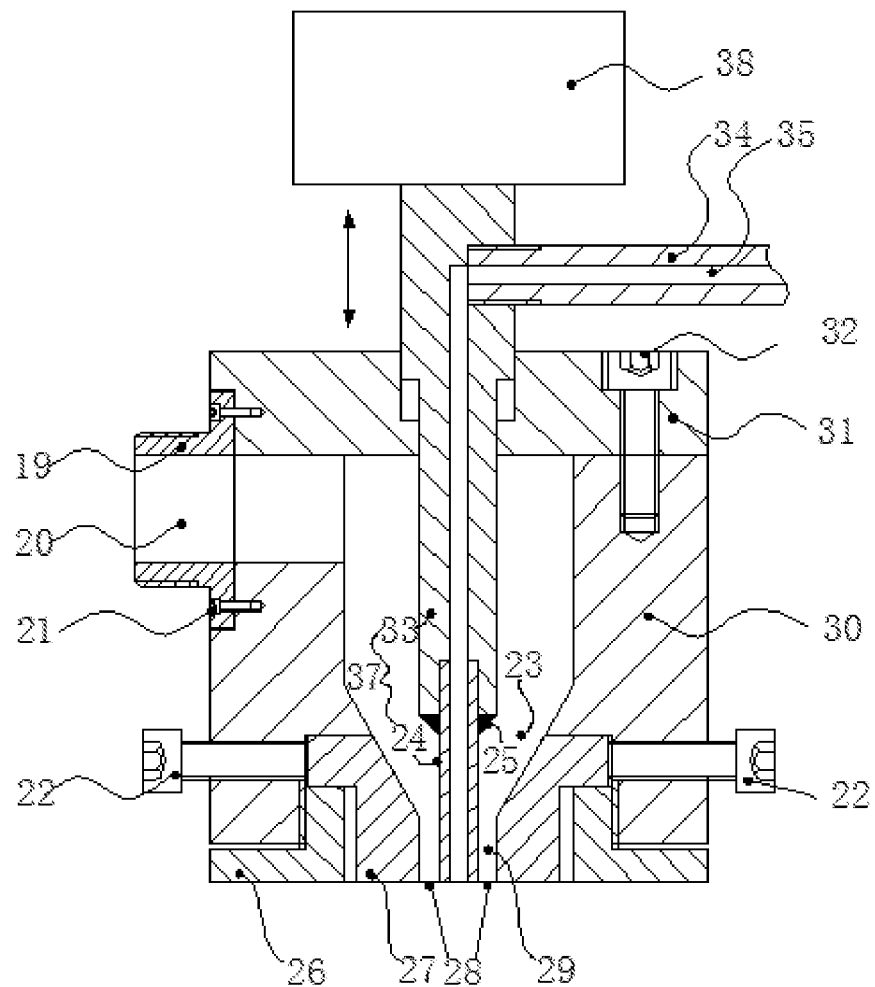
FIG. 2 is a structural schematic diagram of dynamic extrusion die 9 with a core in high-frequency vibration.
Figure 3:
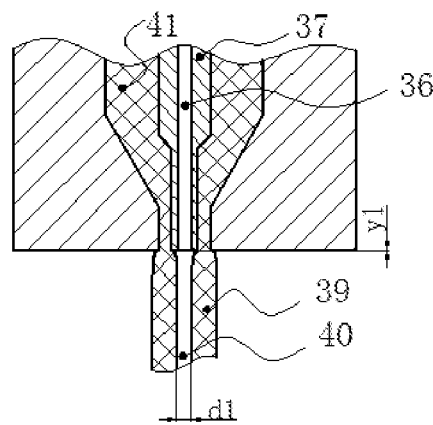
FIGS. 3-6 are a schematic diagram of extrusion molding of plastic articles having micro-channels with constant inner diameter at different end positions of syringe needle 24 under steady-state experimental conditions, wherein the distance between the outer end face of the syringe needle of the syringe core and the outer end face of the head die is $y_{1-4}$ respectively, correspondingly, the inner diameter of the micro-channels is $d_{1-4}$ respectively, and $y_1$ and $d_3$ each is zero.
Figure 4:
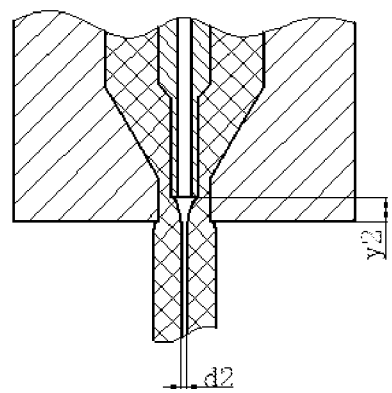
Figure 5:
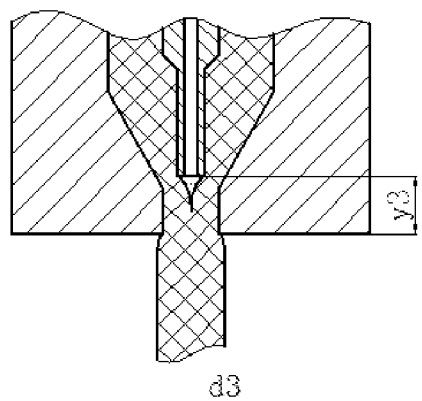
Figure 6:
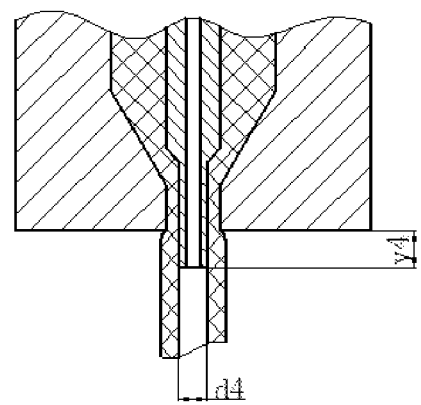

As is shown in FIG. 2, the dynamic extrusion die 9 includes: a die connector 19, a positioning screw 22, a die platen 26, a head die 27, a die body 30, a die cover 31, a syringe core 37 and a linear voice coil motor 38, where the die cover 31 is fixed on the die body 30 by a die cover fixing screw 32; the die connector 19 is fixed on the die body 30 by a connector fixing screw 21; the head die 27 locates at the outlet of the die body 30 and is tightly pressed by the die platen 26; the positioning screw 22 is screwed into the die body 30 to adjust the radial position of the head die 27; the die connector 19, the head die 27, the die body 30 and the die cover 31 together form one flow channel, and the flow channel is formed with a flow channel entrance section 20, a flow channel convergence section 23, a flow channel molding section 29 and a flow channel outlet 28; the syringe core 37 is composed of a syringe body 33 and a syringe needle 24, one end of the syringe body 33 is connected to the linear voice coil motor 38, and the other end of the syringe body 33 passes through the die cover 31 to enter the die body 30 and is soldered with the syringe needle 24, and a copper soldering joint 25 is formed at the soldering location; the internal channel of the syringe body 33 communicates with that of the syringe needle 24 to form a syringe flow channel 36, which communicates with the valve 10 by an air supply flow channel 35 within an air supply pipe 34.

The outer diameter of the syringe needle 24 is small, typically in the range of 0.2-2 mm, a smaller outer diameter is difficult to achieve due to the processing technique, and thus, preferably the outer diameter is 0.4 mm, and the inner diameter is 0.2 mm; the linear voice coil motor 38 drives a high-frequency short-range vibration of the syringe core 37; the positioning screw 22 is screwed into the die body 30 to adjust the radial position of the head die 27, thereby adjusting the flow channel outlet 28. The fluid source 12 can provide a variety of injection fluids, as desired, for example, it may be a tank charged with chemically and physically stable fluid, and also may be a liquid pump. Injection fluid provided may be air, $CO_2$, $N_2$, water vapour, glycerol, silicone oil, etc.

Typically, the operation process of the device for extrusion molding of plastic articles having variable micro-channel includes the following steps (here a single variable micro-channel extrusion die is taken as an example, low density polyethylene (LDPE) is used as plastic materials to be extruded, injection fluid is a compressed gas, the syringe core has a controlled harmonic vibration frequency of 5 Hz):

1. Start the band heater 6 and the heating coil 43, the heating temperatures of the four sections of the heating coils are set in sequence to be 160° C., 170° C., 180° C., and 180° C.;
2. After reaching the set temperature, maintain the temperature for 30 minutes;
3. Start water-cycling of the water sink 13 for cooling and solidifying the plastic extrusion;
4. Start a data acquisition and control system to real-time monitor the temperature, the pressure and other processing parameters;
5. Start a single-screw extruder and set the speed of the screw 4 as 15 revolutions per minute;
6. Start to supply compressed air, where firstly open the valve 10 and then adjust the pressure regulator 11 to 0.2 MPa, which is measured by the pressure sensor P2;
7. Start the linear voice coil motor 38 to make the syringe core 37 undergo a controlled harmonic vibration with a vibration amplitude of 2 mm and a vibration frequency of 5 Hz;
8. Start to add the plastic raw material 1 (LDPE) into the hopper 2;
9. Start the tractor 17 and detect real-time traction rate thereof by the proximity switch 16; and
10. After the stabilization of the extruded plastic, the final extrusion product is obtained by winding via winding device 8.

The method for dynamic extrusion molding of plastic articles having variable micro-channel according to the present invention includes the following steps:

1. drive a screw 4 of a single-screw extruder by a motor 3, and add a plastic raw material 1 into a barrel 5 through a hopper 2 to gradually plasticize the plastic under the rotation and transport of the screw 4 and the electrical heating of a band heater 6, so as to form a plastic melt 41, which passes through flanges 7 to enter a dynamic extrusion die 9 under the rotation and pushing of the screw 4, with a filter provided between flanges 7 trapping the non fully plasticized solid and semi-solid,
2. guide the plastic melt 41 to pass through a die connector 19 to enter a flow channel formed by the die connector 19, a head die 27, a die body 30 and a die cover 31, to cover the exterior of a syringe core 37, where when pressure of the plastic melt 41 in a flow channel convergence section 23 gradually increases to 2-5 MPa, the plastic melt 41 enters a flow channel molding section 29,
3. drive the syringe core 37 to vibrate along an extrusion direction by a linear voice coil motor 38, where the distance y between the outer end face of an syringe needle 24 and the outer end face of the head die 27 varies in patterns of controlled harmonic vibration, as shown in FIG. 8 (in various regular or irregular vibration modes decided by programmes embedded in control system, as shown in FIGS. 10-15); supply the injection fluid by a fluid source 12 and guide the injection fluid to pass through a syringe flow channel 36 into the plastic melt 41 and form a micro-channel under the pressures of the plastic melt 41 and the injection fluid, wherein the interface of the micro-channel periodically varies, thereby forming an extrusion micro-channel 40, and an extrusion plastic matrix 39 is formed with the gradual cooling and solidification of the plastic melt 41,
4. extrude the extrusion plastic matrix 39 having an extrusion micro-channel 40 from a flow channel outlet 28, and introduce it into a water sink 13 by a pulley 14 under the pulling of a tractor 17, where circulation of cooling water 15 is used to rapidly cool and solidify the plastic extrusion, so as to eventually form a plastic extrusion having variable micro-channel 18, and
5. winding or cutting the plastic extrusion: for different plastic extrusions having variable micro-channel 18, such as, a fiber, a small catheter, a film, or a sheet extrusion, installing a winding device 8 according to their structure features; for general plastic extrusions having variable micro-channel 18, such as, a pipe, a plate, a profile, installing a cutting device to cut these extrusions according to requirement to them.

The device and method for dynamic extrusion molding of plastic articles having variable micro-channel according to the present invention is suitable for the manufacture of all plastic articles required to have dynamically variable inner channel in a micron scale, such as a plastic micro-tube, a hollow fiber, a micro-reactor, a micro-mixer, a micro-heat exchanger, a medical micro-tubule; the manufactured plastic articles having multiple variable micro-channels can be used as a foam material, and the porosity and open-close of the aperture can be designed conveniently. Suitable plastic materials include thermoplastic polymers that can be extruded, such as polyethylene (PE), polyvinyl chloride (PVC), polypropylene (PP), polystyrene (PS), polyurethane (PU), polyamide (PA), polyolefin elastomer, etc. Suitable injection fluid may be chemically and physically stable fluid under the process conditions, for example, air, $CO_2$, $N_2$, water vapour, glycerol, silicone oil, etc., and may also be fluid drugs that need to be encapsulated, etc.

What is claimed is:

1. A device for dynamic extrusion molding of plastic articles having variable micro-channel, comprising: a single-screw extruder, flanges (7), a winding device (8), a dynamic extrusion die (9), a valve (10), a pressure regulator (11), a fluid source (12), a water sink (13), a pulley (14), a tractor (17), a data acquisition and control system; wherein the single-screw extruder comprises: a hopper (2), a motor (3), a screw (4), a barrel (5), a band heater (6) and a heating controller (44); a rotation shaft of the motor (3) is connected to the screw (4) within the barrel (5) by a coupler, the exterior of the barrel (5) except for the front and end faces is covered with three sections of the band heater (6), all of which are connected to the heating controller (44), and the barrel (5) is connected to the dynamic extrusion die (9) by the flanges (7), a filter is provided between the flanges 7; the exterior of the dynamic extrusion die (9) except for the front and end faces is covered with a heating coil (43), and the fluid source (12), the pressure regulator (11), the valve (10) and the dynamic extrusion die (9) are connected to each other in sequence by pipes, the water sink (13) is disposed below the dynamic extrusion die (9), the pulley (14) is fixed in the water sink (13), and the tractor (17) and the winding device (8) are disposed in sequence behind the water sink (13); and the dynamic extrusion die (9) comprises a die body (30), a head die (27) that locates at an outlet of the die body (30), a syringe core (37) and a linear voice coil motor (38) that can drive the syringe core (37) to vibrate along an extrusion direction, the syringe core (37) comprises a syringe body (33) and a syringe needle (24), with one end of the syringe body (33) being connected to the linear voice coil motor (38), where a distance y between an outer end face of the syringe needle (24) and an outer end face of the head die (27) varies in patterns of controlled harmonic vibration and the micro-channel has a cross-sectional dimension of micron-scale or nano-scale.

2. The device for dynamic extrusion molding of plastic articles having variable micro-channel according to claim 1, wherein the data acquisition and control system comprises: pressure sensors P1 and P2, temperature sensors T1-T4, a proximity switch (16), a computer with data card (42) and the heating controller (44); where the temperature sensors T1-T3 are respectively mounted at the three sections of the band heater (6) that cover the exterior of the barrel (5) and the temperature sensors T1-T3 are all connected to the heating controller (44), the temperature sensor T4 is mounted at the heating coil (43) that covers the exterior of the dynamic extrusion die (9) and the temperature sensor T4 also is connected to the heating controller (44), the pressure sensor P1 is mounted inside of the dynamic extrusion die (9), the pressure sensor P2 is mounted at outlet of the valve (10), the proximity switch (16) is near to the tractor (17), and the proximity switch (16), the temperature sensor T4 and the pressure sensor P1 are all connected to the computer with data card (42).

3. The device for dynamic extrusion molding of plastic articles having variable micro-channel according to claim 1, wherein the dynamic extrusion die (9) further comprises: a die connector (19), a positioning screw (22), a die platen (26), and a die cover (31), where the die cover (31) is fixed on the die body (30); the die connector (19) is fixed on the die body (30); the head die (27) is tightly pressed by the die platen (26); the positioning screw (22) is screwed into the die body (30) to adjust the radial position of the head die (27); the die connector (19), the head die (27), the die body (30) and the die cover (31) together form one flow channel, and the flow channel is formed with a flow channel entrance section (20), a flow channel convergence section (23), a flow channel molding section (29) and a flow channel outlet (28); the other end of the syringe body (33) passes through the die cover (31) to enter the die body (30) and is soldered together with the syringe needle (24); and the internal channel of the syringe body (33) communicates with that of the syringe needle (24) to form a syringe flow channel (36), which communicates with the valve (10).

4. A method for dynamic extrusion molding of plastic articles having variable micro-channel using the device according to claim 1, wherein the method comprises the following steps:
1) driving the screw (4) of the single-screw extruder by the motor (3), and adding a plastic raw material (1) into the barrel (5) through the hopper (2) to gradually plasticize the plastic under the rotation and transport of the screw (4) and the electrical heating of the band heater (6), so as to form a plastic melt (41), which passes through the flanges (7) to enter the dynamic extrusion die (9) under the rotation and pushing of the screw (4), with a filter between the flanges (7) trapping the non fully plasticized solid and semi-solid;
2) guiding the plastic melt (41) to pass through a die connector (19) to enter a flow channel formed by the die connector (19), the head die (27), the die body (30) and a die cover (31), to cover the exterior of the syringe core (37), where when pressure of the plastic melt (41) in a flow channel convergence section (23) gradually increases to 2-5 MPa, the plastic melt (41) enters a flow channel molding section (29);
3) driving the syringe core (37) to vibrate along the extrusion direction by the linear voice coil motor (38), where the distance y between the outer end face of the syringe needle (24) and the outer end face of the head die (27) varies in patterns of controlled harmonic vibration; supplying the injection fluid by the fluid source (12) and guiding the injection fluid to pass through a syringe flow channel (36) into the plastic melt (41) and form a micro-channel under the pressures of the plastic melt (41) and the injection fluid, where the interface of the micro-channel periodically varies, thereby forming an extrusion micro-channel (40), and an extrusion plastic matrix (39) is formed with the gradual cooling and solidification of the plastic melt (41); and
4) extruding the extrusion plastic matrix (39) having the extrusion micro-channel (40) from the flow channel outlet (28), and introducing it into the water sink (13) by the pulley 14 under the pulling of the tractor (17), where circulation of cooling water (15) is used to rapidly cool and solidify the plastic extrusion, so as to eventually form a plastic extrusion having variable micro-channel (18).

5. The method for dynamic extrusion molding of plastic articles having variable micro-channel according to claim 4, wherein the cross-sectional dimension of the micro-channel is in the range of 50-500 microns.

6. The method for dynamic extrusion molding of plastic articles having variable micro-channel according to claim 4, wherein the cross-section of the micro-channel is circular, triangular, rectangular or polygonal.

7. The method for dynamic extrusion molding of plastic articles having variable micro-channel according to claim 4, wherein the micro-channel has a dynamically variable cycle-length of 100 μm-5 mm.

8. The method for dynamic extrusion molding of plastic articles having variable micro-channel according to claim 4, wherein the micro-channel is a continuous run-through cavity or discontinuous cavities.

9. The method for dynamic extrusion molding of plastic articles having variable micro-channel according to claim 8, wherein the discontinuous cavities are regularly or irregularly spaced cavities.

* * * * *